Patented Mar. 6, 1951

2,543,745

UNITED STATES PATENT OFFICE 2,543,745

FUROIC AMIDES OF AMINO NAPHTHOLS

Harry W. Grimmel, Riegelsville, Pa., and Albert F. Strobel, Phillipsburg, N. J., assignors to General Aniline & Film Corporation, New York, N. Y., a corporation of Delaware No Drawing. Application March 14, 1947, Serial No. 734,870

6 Claims. (Cl. 260—345)

This invention relates to furoic amides of amino naphthols and a process of preparing the same.

In accordance with the present invention, it has been found that furoic amides of amino naphthols which may be prepared by condensing an acid halide of 2-furoic acid with an amino naphthol are a valuable type of novel chemical compounds which have a number of valuable uses. Thus, these novel furoic amides of amino naphthols can be coupled with diazonium salts to give azo dyes which, when metallized, are useful for dyeing and printing fabrics and which in many cases have substantially improved water-solubility characteristics over previously-available azo dyes. It has also been found that the furoic amides of amino naphthols are valuable as photographic chemicals, both as couplers in the so-called diazotype process and also in color photography.

These novel furoic amides of amino naphthols can readily be prepared by adding a 2-furoic acid halide (i. e. furoyl chloride) to a solution of an amino naphthol either in water or an inert organic solvent which has been made basic by the incorporation therein of an inorganic alkali or organic base. In many cases the reaction will proceed readily at room temperature, but if necessary the reaction mixture may be slightly warmed or heated in order to bring about the reaction. It will be apparent that the particular furoic amide of amino naphthol which is prepared will correspond to the particular 2-furoic acid halide and amino naphthol which are employed in carrying out the reaction, and by selection of the particular reactants employed, a wide variety of new and useful products can be obtained.

As examples of aminonaphthols from which the furoic amides of this invention can be prepared may be mentioned 2-amino-1-naphthol, 4-nitro-2-amino-1-naphthol, 4-amino-1-naphthol, 5-amino-1-naphthol, 7-amino-1-naphthol, 8-amino-1-naphthol, 5-nitro-8-amino-1-naphthol, 2,6-diamino-1-naphthol, 4,5-diamino-1-naphthol, 1-amino-2-naphthol, 6-bromo-1-amino-2-naphthol, 4-nitro-1-amino-2-naphthol, 3-amino-2-naphthol, 4-amino-2-naphthol, 5-amino-2-naphthol, 6-amino-2-naphthol, 7-amino-2-naphthol, 8-amino-2-naphthol, 8-nitro-7-amino-2-naphthol, 2-amino-4-bromo-1-naphthol, 4-amino-3-bromo-2-nitro-1-naphthol, 4-amino-3-iodo-2-nitro-1-naphthol, 4-amino-2,3-dinitro-1-naphthol, 8-amino-7-methyl-1-naphthol, 4-amino-2-nitro-1-naphthol, 2,4-diamino-8-methoxy-1-naphthol, 3-amino-4-(o-aminophenyl)-2-naphthol, 7-amino-6-bromo-1-naphthol, 1-amino-3-chloro-2-naphthol and 1-aminomethyl-2-naphthol.

As examples of 2-furoic acids whose acid halides can be used for the preparation of the amides of this invention may be mentioned 2-furoic acid, 3-chloro-2-furoic acid, 5-chloro-2-furoic acid, 3,4-dichloro-2-furoic acid, 3,5-dichloro-2-furoic acid, 3-bromo-2-furoic acid, 5-chloro-3,4-dibromo-2-furoic acid, 3,4,5-tribromo-2-furoic acid, 5-nitro-2-furoic acid, 3-chloro-5-nitro-2-furoic acid, tetrahydro-2-furoic acid, 5-acetamido-2-furoic acid, 5-acetyl-2-furoic acid, 2-ethyl-tetrahydro-2-furoic acid, 5-amyl-2-furoic acid, 3-cyano-2-furoic acid, 3-methyl-2-furoic acid and 3-methyl-5-nitro-2-furoic acid.

The following examples are specific illustrations of preferred methods of preparing the novel compounds of the present invention:

Example 1

106 g. of 2-furoyl chloride was added dropwise to a vigorously agitated suspension of 105 g. of 8-amino-2-naphthol in 500 g. of water and 100 g. of sodium carbonate, keeping the mixture at 35° C. by cooling with ice water. As the furoyl chloride was added, a tarry, tacky precipitate gradually formed in the water. This mass remained undissolved when the addition of furoyl chloride was completed, and on standing overnight went over to a solid precipitate. In the morning, the precipitate (after filtering) was dissolved in 1500 ml. of 10% sodium carbonate at the boil, then precipitated into dilute hydrochloric acid after cooling. After filtering the gray-white precipitate, it was slurried with 1 liter of 5% sodium bicarbonate at 70° C., filtered and dried. The dried product weighed 180 g. and a small sample, recrystallized from alcohol, analyzed as the furoic amide of 8-amino-2-naphthol.

By substituting 7-amino-2-naphthol in the above procedure, the furoic amide of 7-amino-2-naphthol is obtained.

Example 2

86 g. of 2-furoyl chloride was added dropwise to 105 g. of 5-amino-1-naphthol in 1000 ml. of xylene and 90 ml. of pyridine at 100° C. over a period of 1 hour. The mixture was heated to 135° C. for 1 hour, after which time it was cooled to room temperature. The solid precipitate was filtered off and the mixture of xylene and pyridine extracted with 5% caustic solution. The sodium hydroxide extract was precipitated by pouring into cold dilute hydrochloric acid solution, and after filtering it was added to the solid filtered from the xylene. The entire precipitate was treated with 1000 ml. of 5% sodium bicarbonate solution, heated to 70° C. and filtered. The product obtained was dried at 70° C. in air, analyzed after recrystallization as the furoic amide of 5-amino-1-naphthol.

We claim:
1. 2-furoic amides of an amino naphthol.
2. 2-furoic amide of amino-2-naphthol having the formula:

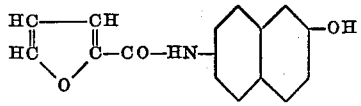

3. 2-furoic amide of amino-1-naphthol having the formula:

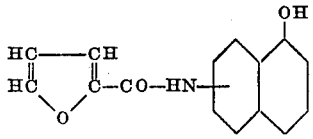

4. 2-furoic amide of 8-amino-2-naphthol having the formula:

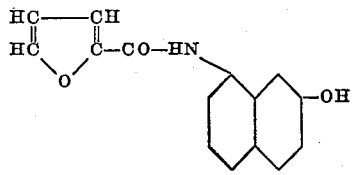

5. 2-furoic amide of 7-amino-2-naphthol having the formula:

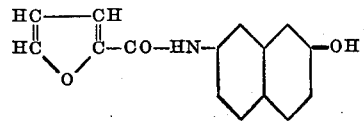

6. 2-furoic amide of 5-amino-1-naphthol having the formula:

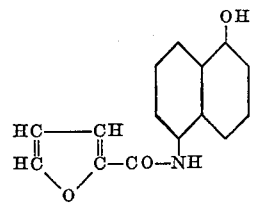

HARRY W. GRIMMEL.
ALBERT F. STROBEL.

REFERENCES CITED

The following references are of record in the file of this patent:

UNITED STATES PATENTS

| Number | Name | Date |
|---|---|---|
| 1,188,544 | Julius et al. | June 27, 1916 |
| 2,144,220 | Etzelmiller | Jan. 17, 1939 |
| 2,161,745 | McNally et al. | June 6, 1939 |
| 2,260,632 | Moore et al. | Oct. 28, 1941 |

OTHER REFERENCES

Gilman et al.: Chemical Reviews, vol. Aug.–Dec. 1932, page 325, July 30, 1932.
Bowen et al.: J. Am. Chem. Soc., vol. 62, pp. 3522–3523 (1940).
Fierz-David et al.: Chemical Abstracts, vol. 33, pp. 6289–6290.